UNITED STATES PATENT OFFICE.

FELIX EHRLICH, OF BERLIN, GERMANY, ASSIGNOR TO ADOLF SULTAN AND ISIDOR STERN, OF BERLIN, GERMANY.

PROCESS FOR THE MANUFACTURE OF FUSEL-OIL AND ITS COMPONENTS.

No. 885,591.     Specification of Letters Patent.     Patented April 21, 1908.

Application filed March 22, 1906. Serial No. 307,410.

*To all whom it may concern:*

Be it known that I, FELIX EHRLICH, chemist, a citizen of Germany, and a resident of Berlin, in the Kingdom of Prussia and Empire of Germany, have invented a new Method for the Manufacture of Fusel-Oil and its components, of which the following is a specification.

Fusel-oil, which was formerly an undesirable by-product obtained in the preparation of alcohol from corn, potatoes, molasses and other fermentable substances, has become to-day an important raw material for technical purposes, and has found varied uses in different industries.

The amyl alcohol of the mixture of iso-amyl-alcohol and optically active amyl-alcohol, (which vary according to the origin of the mash), is contained in fusel-oil, and is a very much sought for article which is chiefly used for producing amyl-acetate and the various amylic esters for the manufacture of fruit ethers, fruit flavors, etc., and which serves even in industrial chemistry as a frequently used solvent.

For industrially producing the amyl-alcohols and the other components of fusel-oil, the only method heretofore employed, was spirit manufacture, as the synthetic chemical method for producing the higher homologues of the ethyl-alcohol could never find a practical application, owing to their being very complicated and their yield very small, and the quality and yield of fusel-oil produced in a single fermentation of spirit manufacture was very small, depending on processes entirely beyond the control of the manufacturer. There have heretofore been no practical processes known for producing fusel-oil or its most valuable components, such as amyl-alcohol in any large quantity.

I have found that fusel-oil in the fermentation process of spirit manufacture is formed from those amino-acids, which correspond to those of the alcohols contained in fusel-oil and which are to be found in hydrolised albuminous substances and are the products of the decomposition of albumin. If such amino-acids are left in the presence of carbohydrates under the influence of ferments, such as yeasts and the like, fusel-oil corresponding in composition to those products of the decomposition of the albuminous substance, or components of these is obtained. This formation is explained by the simple chemical relations existing between the chemical composition of these products of albumin and the components of the fusel-oil. Hence from that amino-acid, leucin, which is the chief product of the decomposition of an albuminous substance, iso-amyl-alcohol is produced, which is the chief component of the fusel-oil. It will be found that iso-amyl-alcohol can be produced by the aid of ferments, such as yeasts from leucin and by hydrolizing carbonic acid and ammonia according to the following equation:

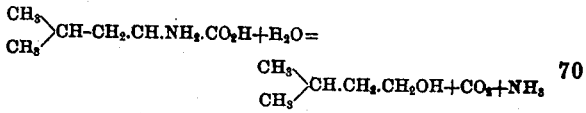

In a similar manner the optically active amyl-alcohol, which is also contained in all fusel-oils in addition to the iso-amyl-alcohol, particularly in molasses fusel-oil is produced from the iso-leucin, which was discovered and explained as to its constitution by me some time ago, (Cf. F. Ehrlich, *Berichte der Deutschen Chemischen Gesellschaft*, 37th year (1904), pages 1809 to 1840), according to the following equation:

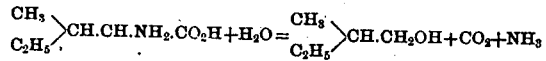

In a similar manner the alcohols contained in fusel-oil, besides those already mentioned, are formed. For instance, the iso-butyl-alcohol is produced from the amino-isovaleric acid, according to the following equation:

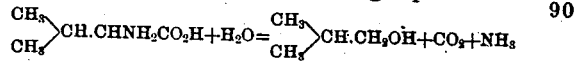

For producing the alcohols of the fusel-oil, the amino acids corresponding to these alcohols in their constitution, such as leucin, iso-leucin, amino-isovaleric acid, and the like, are added to the usual mash, and the usual ferment, such as yeast, is added, and fermentation is effected in the usual manner at about seventy-seven to eighty-six degrees Fahrenheit. The spirit produced is distilled after this operation and separated from the fusel-oil in the spirit rectifier in the same manner now used in spirit manufacture.

In carrying out the process any usual kind of mash containing sugar is employed as the carbohydrate, the principal being the mashes made of corn of all kinds, rye, wheat, barley, oats, Indian corn, rice, potatoes, beetroot, cane sugar, molasses etcetera. As the amyl-alcohol or the mixture of iso-amyl-alcohol and amyl-alcohol is the most important and valuable of all of the components of the fusel-oil, those mashes will generally be combined with the leucins individually or mixed, purified or not, or with the impure leucins produced by hydrolizing the albuminous substance of casein, bloodfibrin, waste yeast dregs and the like or separated from the distiller's waste of molasses. Such hydrolizing of albuminous substance may be effected by acids, alkaline fluids or ferments such, for instance, as trypsin, as is clearly described in hand books of organic chemistry, (See Bernthsen, *Organic Chemistry*, London, 1889, page 516, and Roscoe und Schorlemmer, *Ausfuhrliches Lehrbuch der Chemie*, (Braunschweig, 1901), Vol. 9, page 35, etc. and in the *Berichte der Deutschen Chemischen Gesellschaft*, Vol. 37, year 1904, pages 1831 to 1833.) To these substances suitable food-salts are added in order to give to the leaven or yeast the material which it requires for its formation in addition to nitrogen, such for instance, as phosphorous salts, and the like.

The following are examples of the process:

*Potato mash.*—1000 kg. potatoes are steamed in the usual manner in the Henze apparatus and saccharified after jellifying with 20 kg. green malt in a steeping trough at a temperature of 60–65 Cent. (140–149° Fahrenheit). To the still hot mash leucin is added in any desired quantity; for instance, in the present example 25 kg. unpurified leucin is added and the mixture heated until the substance is entirely dissolved. This unpurified leucin is a mixture of leucin and iso-leucin produced by the hydrolysis or splitting of albuminous substances. The thus prepared mash is then mixed in the fermentation vat with distiller's yeast in a suitable manner and ferments at a temperature of 25–30 Cent. (77–86° Fahrenheit). During the fermentation the added leucin will be transformed into amyl-alcohol, which is obtained together with the raw spirit on the subsequent distilling of the mash. For separating the fusel-oil either the raw spirit is fractioned in any known manner in the distilling column or the mash is directly treated in a suitable manner in a spirit rectifier, whereby the spirit is obtained in the usual manner in a refined state, whereas the amyl-alcohol will be collected in the fusel-oil separators. In this example from 1000 kgs. potatoes and 25 kg. raw leucin, 120 liters of refined spirit and about 10 kg. amyl-alcohol would be obtained. If the leucin has not been entirely transformed into amyl-alcohol, more fresh mash and fresh yeast is added to the original mash, and fermentation is continued until the leucin is entirely transformed.

*Molasses mash.*—1000 kg. molasses of 80° on the Brix scale and of about 50% contents of sugar after having been, if necessary, heated in an autoclave for sterilizing, is mixed with from two to three times its weight of water, and the thus produced liquor is slightly acidified with hydrochloric or sulfuric acid, heated for awhile to drive out the volatile fatty acids, as formic acid and acetic acid, and then cooled to the fermenting temperature. About one-third of this molasses mash is now mixed with the amount of leaven or yeast necessary for the whole quantity and left for a few hours at a temperature of 20 to 23 Cent. (68–73° Fahrenheit); then the remaining two-thirds of the molasses mash is added; in this has been previously dissolved the amount of leucin to be transformed into fusel-oil in the form, for instance of 80 kg. or impure leucin obtained for instance from the distiller's wash of molasses in the manner described in *Berichte der Deutschen Chemischen Gesellschaft*, Vol. 37, (1904) page 1817. Fermentation is then effected as usual at 25–30 Cent. (77–86 Fahrenheit), whereupon the thereby formed products, alcohol and fusel-oil are separated as is usually done in molasses distilleries. In this example, if the leucin is completely transformed about 300 liters of spirit and about 40 kg. amyl-alcohol will be obtained.

It has been found advisable to employ for the above process yeast or leaven containing as little nitrogen as possible.

Having thus described my invention, what I claim is:

1. A process of making fusel-oil and its components, which consists in adding leucin, iso-leucin and amino-isovaleric acid to a medium containing carbo-hydrates and ferments then effecting in any known manner fermentation of the mass and separating the fusel-oil and its components, thereby produced, from the ethyl-alcohol formed at the same time.

2. A process of making fusel-oil and its components consisting in exposing materials rich in leucin, iso-leucin and amino-isovaleric acid to the action of ferments in the presence of a medium containing carbo-hydrates, by adding such materials to mashes, such as molasses, potato mash, and the like, effecting fermentation in the usual manner and separating the fusel-oil and its components produced in the fermentation from the ethyl-alcohol formed by said process.

3. A process for making fusel-oil and its components, which consists in adding leucin to a mash, then adding yeast to effect fermentation of the mass and separating the fusel-oil and its components so formed from the ethyl-alcohol formed by the process.

4. A process for making fusel-oil and its components, which consists in adding iso-leucin to a mash, then adding yeast to effect fermentation of the mass, and then separating the fusel-oil and its components from the ethyl-alcohol produced by the process.

5. A process for making fusel-oil and its components, which consists in adding leucin to a medium containing carbo-hydrates and suitable food salts, then effecting fermentation in the mass, and then separating the fusel-oil and its components produced by the fermentation from the ethyl-alcohol formed in the process.

In testimony whereof I have hereunto set my hand in presence of two subscribing witnesses.

FELIX EHRLICH.

Witnesses:
  WOLDEMAR HAUPT,
  HENRY HASPER.